(12) United States Patent
Weising (10) Patent No.: US 9,372,701 B2
(45) Date of Patent: Jun. 21, 2016

(54) MANAGEMENT OF DIGITAL INFORMATION VIA A BUOYANT INTERFACE MOVING IN THREE-DIMENSIONAL SPACE

(75) Inventor: George Weising, Culver City, CA (US)

(73) Assignee: Sony Interactive Entertainment America LLC, San Mateo, CA (US)

(*) Notice: Subject to any disclaimer, the term of this patent is extended or adjusted under 35 U.S.C. 154(b) by 796 days.

(21) Appl. No.: 12/778,473

(22) Filed: May 12, 2010

(65) Prior Publication Data

US 2011/0283238 A1 Nov. 17, 2011

(51) Int. Cl.
G06F 3/048 (2013.01)
G06F 9/44 (2006.01)
G06F 3/0481 (2013.01)

(52) U.S. Cl.
CPC .......... *G06F 9/4443* (2013.01); *G06F 3/04815* (2013.01)

(58) Field of Classification Search
CPC ........................ G06F 9/4443; G06F 3/04815
USPC ................................................. 715/852, 848
See application file for complete search history.

(56) References Cited

U.S. PATENT DOCUMENTS

| | | | | |
|---|---|---|---|---|
| 5,740,549 A | * | 4/1998 | Reilly et al. | 705/14.42 |
| 5,852,440 A | * | 12/1998 | Grossman et al. | 715/811 |
| 6,166,738 A | * | 12/2000 | Robertson et al. | 715/839 |
| 6,288,715 B1 | * | 9/2001 | Bain et al. | 345/211 |
| 6,289,380 B1 | * | 9/2001 | Battat et al. | 709/224 |
| 6,628,313 B1 | * | 9/2003 | Minakuchi et al. | 715/853 |
| D485,279 S | | 1/2004 | Decombe | |
| D497,617 S | | 10/2004 | Decombe | |
| 6,879,332 B2 | | 4/2005 | Decombe | |
| 6,888,554 B1 | | 5/2005 | Decombe | |
| 6,910,191 B2 | * | 6/2005 | Segerberg | H04N 5/44543 348/E5.105 |
| D513,511 S | | 1/2006 | Decombe | |
| 7,036,093 B2 | | 4/2006 | Decombe | |
| D528,556 S | | 9/2006 | Decombe | |
| D545,323 S | | 6/2007 | Decombe | |
| D545,324 S | | 6/2007 | Decombe | |
| 7,290,223 B2 | | 10/2007 | Decombe | |
| 7,603,628 B2 | | 10/2009 | Park et al. | |
| 2001/0028369 A1 | * | 10/2001 | Gallo et al. | 345/848 |
| 2002/0015064 A1 | * | 2/2002 | Robotham et al. | 345/863 |
| 2002/0054117 A1 | * | 5/2002 | van Dantzich et al. | 345/766 |
| 2002/0060650 A1 | * | 5/2002 | Wakashiro et al. | 345/9 |
| 2004/0117727 A1 | * | 6/2004 | Wada | 715/500 |

(Continued)

FOREIGN PATENT DOCUMENTS

WO    WO 2011/142856    11/2011

OTHER PUBLICATIONS

Animated desktop icons, Digitally Imported Forums, available at http://forums.di.fm/computers-and-information-technology/animated-desktop-icons-115910/ (Feb. 2, 2007).*

(Continued)

*Primary Examiner* — Doon Chow
*Assistant Examiner* — Conrad Pack
(74) *Attorney, Agent, or Firm* — Polsinelli LLP (57) ABSTRACT

An interface for managing digital information is provided. Digital information including one or more digital files is stored in memory. An icon is associated with the digital information and rendered inside a translucent bubble. The bubble may be manipulated in the digital environment by a user.

19 Claims, 7 Drawing Sheets

(56) References Cited

U.S. PATENT DOCUMENTS

| | | | |
|---|---|---|---|
| 2005/0039145 A1 | 2/2005 | Diering et al. | |
| 2005/0278738 A1* | 12/2005 | Kaneko | G06F 3/04842 725/40 |
| 2007/0035513 A1* | 2/2007 | Sherrard et al. | 345/157 |
| 2007/0124677 A1* | 5/2007 | de los Reyes et al. | 715/705 |
| 2007/0171192 A1* | 7/2007 | Seo et al. | 345/156 |
| 2007/0266135 A1* | 11/2007 | Friedland et al. | 709/223 |
| 2008/0084970 A1* | 4/2008 | Harper | 379/79 |
| 2008/0201649 A1* | 8/2008 | Mattila et al. | 715/763 |
| 2008/0261569 A1 | 10/2008 | Britt et al. | |
| 2009/0019385 A1* | 1/2009 | Khatib et al. | 715/765 |
| 2010/0001960 A1* | 1/2010 | Williams | G06F 3/04883 345/173 |
| 2010/0004008 A1 | 1/2010 | Abolrous et al. | |
| 2010/0077361 A1* | 3/2010 | Watkins | 715/863 |
| 2010/0107128 A1* | 4/2010 | Thukral | 715/867 |
| 2010/0138784 A1* | 6/2010 | Colley | 715/810 |
| 2010/0218141 A1* | 8/2010 | Xu et al. | 715/834 |
| 2010/0257438 A1* | 10/2010 | Becerra et al. | 715/204 |
| 2010/0309228 A1* | 12/2010 | Mattos et al. | 345/654 |

OTHER PUBLICATIONS

Agarawala, Anand, Rethink the desktop with BumpTop, TED Talks, available at http://www.ted.com/talks/anand_agarawala_demos_his_bumptop_desktop.html (Mar. 2007).*

Gechlik, Karl L., Bump Your Desktop Icons With Shock Desktop (Windows), makeuseof.com, available at http://www.makeuseof.com/tag/bump-your-desktop-icons-with-shock-desktop-windows-only/ (Dec. 13, 2008).*

PCT/US11/23761 International Search Report and Written Opinion mailed on Apr. 6, 2011.

* cited by examiner

MANAGEMENT OF DIGITAL INFORMATION VIA A BUOYANT INTERFACE MOVING IN THREE-DIMENSIONAL SPACE

BACKGROUND OF THE INVENTION

1. Field of the Invention

The present invention generally relates to managing digital information. More specifically, the present invention relates to an interface for managing digital information.

2. Background of the Related Art

Presently available methods for managing digital information may include various textual and graphic interfaces. In one interface, visual depictions of folders may be used to represent a collection of digital files, each of which may be represented by an icon. A user may move the folder around a virtual desktop, as well as move the icons in, out, and around the folder.

To some people, folders may not be very attractive, enjoyable, or convenient to use. For example, one folder may look identical to another folder, yet hold very different types of files. Other than the name of the folder, there may be no indication of what types of digital files a particular folder holds. A user in search of a particular folder may either have to read through a list of folder names or manually create a search for the particular folder name. Neither option is convenient or efficient.

In addition, users are increasingly becoming accustomed to the incorporation of computing, specifically multi-media computing, into more aspects of their daily lives. Users have come to expect a richer, more interactive experience when dealing with computing devices. Such user experiences may incorporate various combinations of visual, audio, video, multimedia, and interactive tools. While such rich media have been incorporated in many aspects of computing, many data management systems still rely on the use of simple folder icons.

Mobile computing is also becoming more prevalent. Mobile devices may be limited, however, in terms of display size. Such devices may not be able to display a large number of full-size folder icons. Shrinking the folder icons, however, may only serve to decrease the size and legibility of the folder name. In addition, some folders may be used more often than others, yet all folders may be represented by visually similar (if not identical) and uniformly sized icons.

There is a need for improved interfaces for managing digital information.

SUMMARY OF THE CLAIMED INVENTION

Embodiments of the invention provide an interface for managing digital information. Digital information including one or more digital files is stored in memory. An icon associated with the digital information is rendered inside a translucent bubble. The bubble may be manipulated in the digital environment by a user. One or more bubbles may be used to organize various digital files, as well as manage such files in the digital environment. The digital environment may further be presented as a three-dimensional space in which one or more bubbles may appear to float. At the option of the user, a bubble may be anchored to a particular location in the digital environment. Views and previews of the contents of the bubble may also be provided upon user request.

Various embodiments of the present invention may include methods for managing digital information. Such methods include storing digital information including one or more digital files in memory, executing instructions to identify an icon associated with the digital information, and rendering a bubble image comprising the icon inside a translucent bubble. The bubble image, which appears to float in the digital environment, may be manipulated in the digital environment by a user.

Manipulation may include movement of the bubble around the digital environment, anchoring the bubble to a location in the digital environment, rendering previews of the digital information, rendering partial or full displays of the digital information, and indicating relationship(s) between digital files. The bubble images and movement thereof may be rendered so as to appear three-dimensional.

Further embodiments of the present invention, computer-readable storage media is provided. Embodied on such computer-readable storage media may be a program that is executable by a processor to perform a method for an interface for managing digital information.

DETAILED DESCRIPTION

Digital information including one or more digital files is stored in memory. An icon associated with the digital information is rendered by graphics processing hardware and software such that the digital information appears inside a translucent bubble. The bubble may be manipulated in the digital environment by a user through a controller, a touch screen, or gesture recognition. One or more bubbles may be used to organize various digital files, as well as manage such files in the digital environment. The digital environment may be presented as a three-dimensional space in which one or more bubbles may appear to float. At the option of the user, a bubble may be anchored to a particular location in the digital environment. Views and previews of the contents of the bubble may be provided upon user request.

Figure 1:
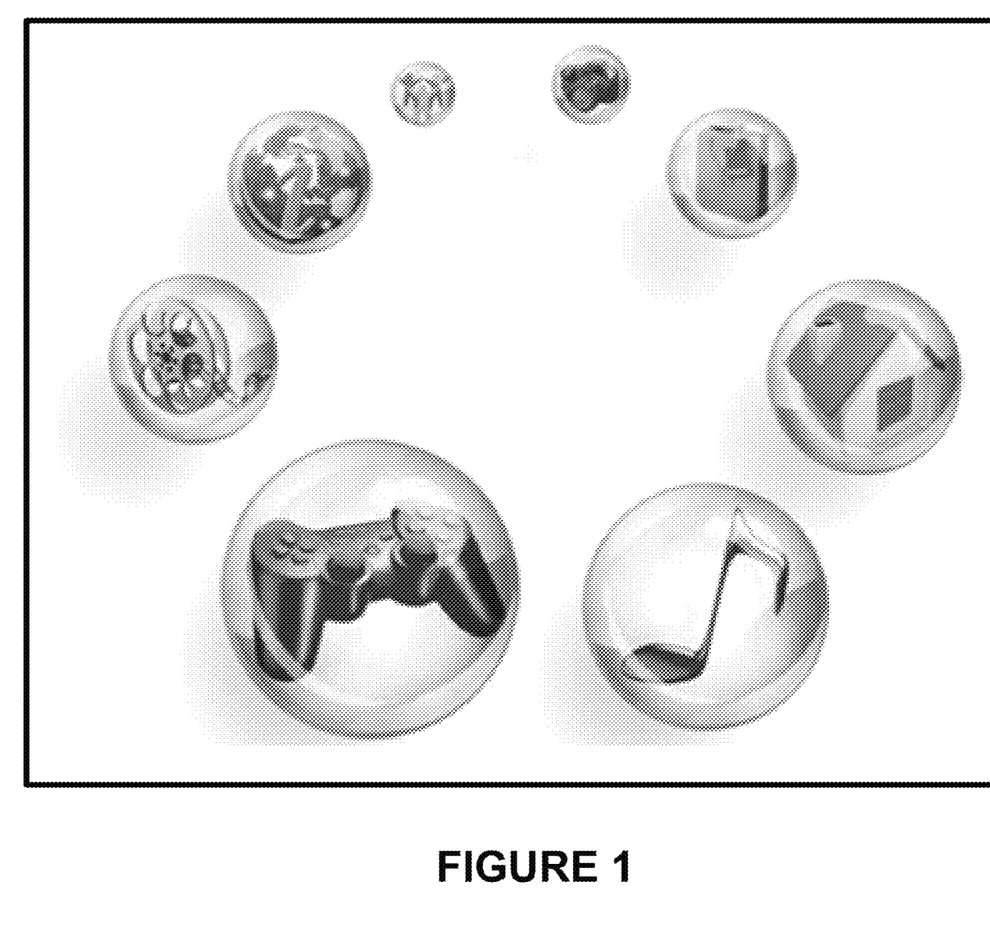
FIG. 1 illustrates an interface for managing digital information.

FIG. 1 illustrates an interface for managing digital information. FIG. 1 illustrates eight bubbles appearing to float in a three-dimensional space, in which the bubbles that are farther away from the user appear smaller than those bubbles that are closer to the user. Each bubble encloses an icon representing a type of information. An icon may or may not take on the shape of the bubble. For example, one bubble encloses an icon of a single musical note inside a bubble, indicating that the bubble is associated with digital information and files related to music. The game controller icon may indicate digital information related to games. The film reel icon may indicate video-related information. The camera icon may indicate photographs or pictorial content, and so on. Alternatively, a bubble may enclose a portion of a photograph or type of visual artwork/design that has been cropped or otherwise adjusted to take on the shape and size of the bubble.

User manipulation of a bubble may include moving the bubble around the digital environment, anchoring the bubble in place in the digital environment, initiating a preview or full display of the information associated with the bubble. Such manipulation may take place using the aforementioned controller, touch screen, or gesture recognition system. These various input and control means may be coupled to a computing device operating the requisite graphics processing hardware and software necessary to render the interface display on a corresponding display device.

Certain types of user manipulation of the bubble images may be associated with audio and/or visual effects. For example, user selection of an icon may be accompanied by an animated effect in which the bubble appears to pop; a corresponding sound may likewise be generated (e.g., pop!). Alternatively, the bubble may appear to be flattened, squeezed, bounced, grown, shrunk, altered, merged with another bubble, or 'bud' from another bubble. Certain user actions that may be associated with such effects based on default and/or user settings. For example, combining digital information may be associated with the visual effect depicting merging bubbles. Similarly, creating a new category for digital information may be associated with the visual effect of a new bubble budding off from another bubble.

The bubble images may also appear to float and travel around the digital environment when not being used or manipulated by the user. Travel of a bubble may occur according to a specified pattern or a random pattern, depending on default and/or user-defined preferences. In addition, the floating bubbles may appear to travel off-screen and back on-screen again. The random or predefined pattern may cause the bubbles to appear to bounce off the sides of the digital environment (i.e., the sides of the display screen).

The user may also specify preference regarding the patterns and groupings in which the bubbles float. For example, the user may specify that certain commonly used bubbles may float freely and prominently, while less-used bubbles remain stationary or even hidden. In another example, the user may specify that the bubbles revolve around the center of the digital environment in concentric circles, wherein each circle represents a different category of bubble. Indicating user preferences to software governing the operation and display of the interface environment may be provided via any number of configuration interfaces, web forms, 'tick' boxes, and other means of confirming information entry as are known in the art.

Figure 2:
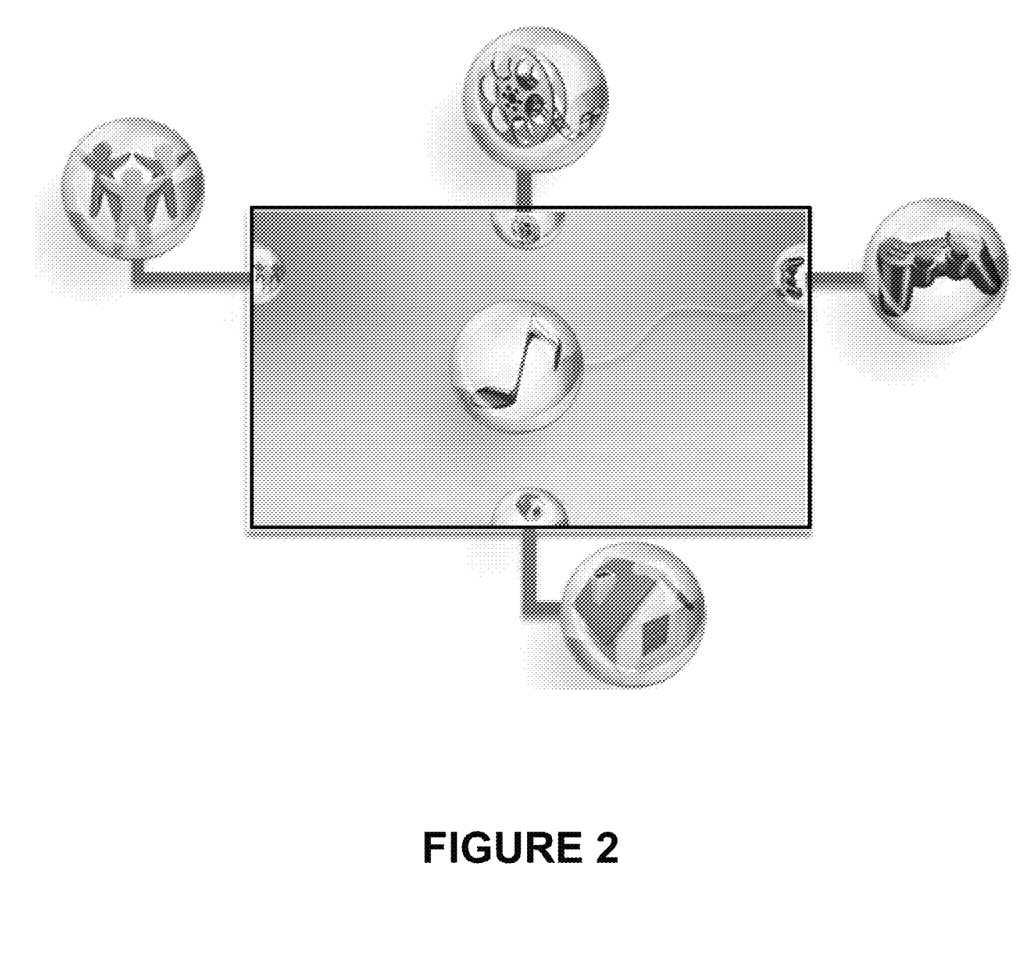
FIG. 2 illustrates another interface for managing digital information.

FIG. 2 illustrates another interface for managing digital information. The screenshot of FIG. 2 illustrates four bubbles that have been anchored to certain locations at the sides of the digital environment. Specifically, only a portion of the bubble appears in the digital environment. Anchoring a bubble may also serve a similar function as a dock, which allows for users to launch and switch between displays of different digital information. While the screenshot illustrates four bubbles anchored to the sides of the digital environment, a bubble may also be anchored towards the center of the digital environment, as illustrated by the musical icon bubble in FIG. 2. Although anchored bubble is confined in its ability to travel throughout the digital environment, the bubble may still exhibit small bobbing movement at the anchored location. As such, the bubble may mimic the motion of a balloon or buoy that may be anchored in place, but still bobs or bounces up and down.

While anchoring may involve rendering a bubble relatively confined to a particular location in the digital environment, anchoring may alternatively include limiting the field of motion in which the bubble can travel. For example, a bubble anchored to a side of the digital environment may be allowed to float along the side (or a portion thereof) of the digital environment. A bubble anchored to a certain path along the sides, however, may not be allowed float towards the center of the digital environment. Limiting the field of motion may keep the digital environment from becoming too cluttered or busy, while still maintaining the visual interest of movement. Such movement may, further, serve a utilitarian role when there are too many bubbles to depict in a display that is limited in size. The anchored bubbles may float along the sides of the digital environment (including off-screen) like a scrolling menu.

Also illustrated in FIG. 2 is a bubble floating in the center of the digital environment that appears to be tethered to one of the anchored bubbles. Such tethering may be displayed based on user-designations. Tethering may also be based on default settings associated with particular types of relationships between digital information. For example, a balloon associated with media information may include audio (e.g., music) and video files (e.g., a music video). Music may further encompass various artists, albums, and songs. Depending on user preferences, related information may be tethered together. Subcategories may also appear tethered to parent categories. Depending on the type of relationship with which it is associated, tethers may also appear in different colors, thickness, and shapes. Tethering may be recognized through certain control input, gestures, or contact with a touch screen interface.

Figure 3A:
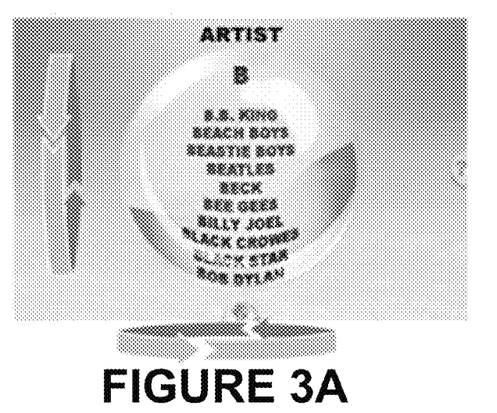
FIGS. 3A-3D each illustrate an interface for previewing digital files.

FIG. 3A illustrates an interface for previewing digital files. Before being selected for preview, the bubble may have appeared to enclose a musical note (as illustrated in FIG. 1 or 2). A user may select the bubble for preview by clicking (or right-clicking) on the bubble using a mouse, pressing a button on a controller device, touching the bubble for a predetermined period of time via a touch screen, or executing a particular gesture with respect to a gesture recognition system. A preview of musical files may include a listing by artist. Because the bubble is limited in size, a partial list may be displayed. The user may scroll up and down to review the rest of the list by actuating a joystick, manipulating a mouse, pressing directional buttons, grazing a touch screen, or executing an appropriate gesture.

Alternatively, the user may review the rest of the list by scrolling from side to side. In some embodiments, scrolling up/down or sideways may be used to jump to bookmarks or the next letter in an alphabetized list. Scrolling (up/down or sideways) may also be used to change the preview display of the list. For example, instead of a list of artist names, the list may be displayed as a series of thumbnail photographs of the artist or related images (e.g., album covers, concert photographs). Scrolling may also depend on default or user preferences. For example, a user may specify that scrolling up and down allow for review of a list. Scrolling from side to side, however, may generate additional previews (e.g., more detailed information) regarding a particular item in the list.

Figure 3B:
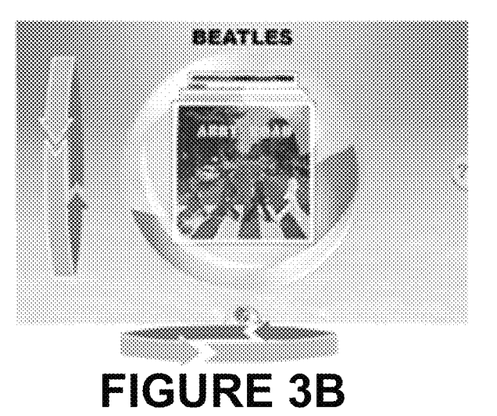

For example, the list illustrated in FIG. 3A includes The Beatles, which appears in the center of the displayed bubble. FIG. 3B illustrates another interface for previewing digital files. If a particular musical artist (e.g., The Beatles) is selected from the preview list of musical artists illustrated in FIG. 3A, another preview list (e.g., list of albums) may be generated. In one exemplary embodiment, the user may have selected The Beatles for preview from the list. The screenshot of FIG. 3B illustrates a particular album cover (i.e., Abbey Road) associated with The Beatles. Further scrolling may prompt additional album covers associated with The Beatles (e.g., in alphabetical order) for preview.

Figure 3C:
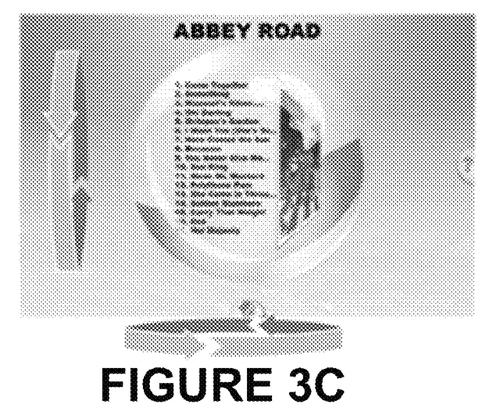

FIG. 3C illustrates another interface for previewing digital files. The preview includes a list of songs on the album "Abbey Road" associated with The Beatles. Such a preview may be generated by scrolling sideways (or up/down if sideways scrolling was used to browse through album covers).

Figure 3D:
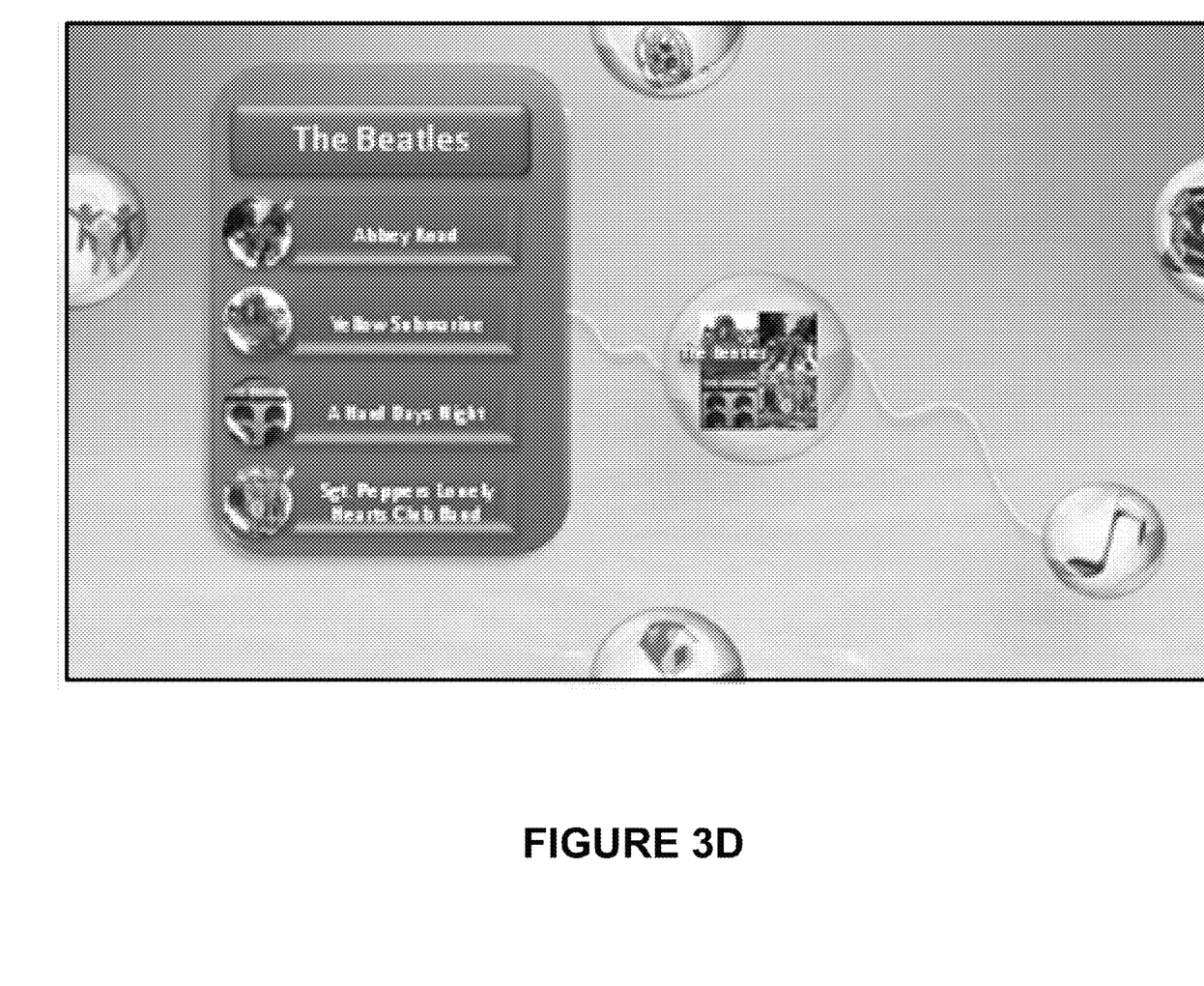

FIG. 3D illustrates yet another interface for previewing digital files. In the illustrated preview, the bubble representing the broadest category is the music note. The music note bubble is depicted as being tethered to a bubble representing a less broad category (e.g., The Beatles). The bubble associated with The Beatles is further tethered to another preview display illustrating a list of albums. As illustrated, tethering may represent a relationship between a broad category and a subcategory, and between the subcategory and a subcategory of the subcategory (sub-subcategory). The preview display of the sub-subcategory is larger and squarer than the other bubbles. In some implementations of preview displays, a normal, round bubble may be expanded to resemble a rectangular window. The album covers listed within the display may be depicted as smaller bubbles within the expanded window.

Figure 4:
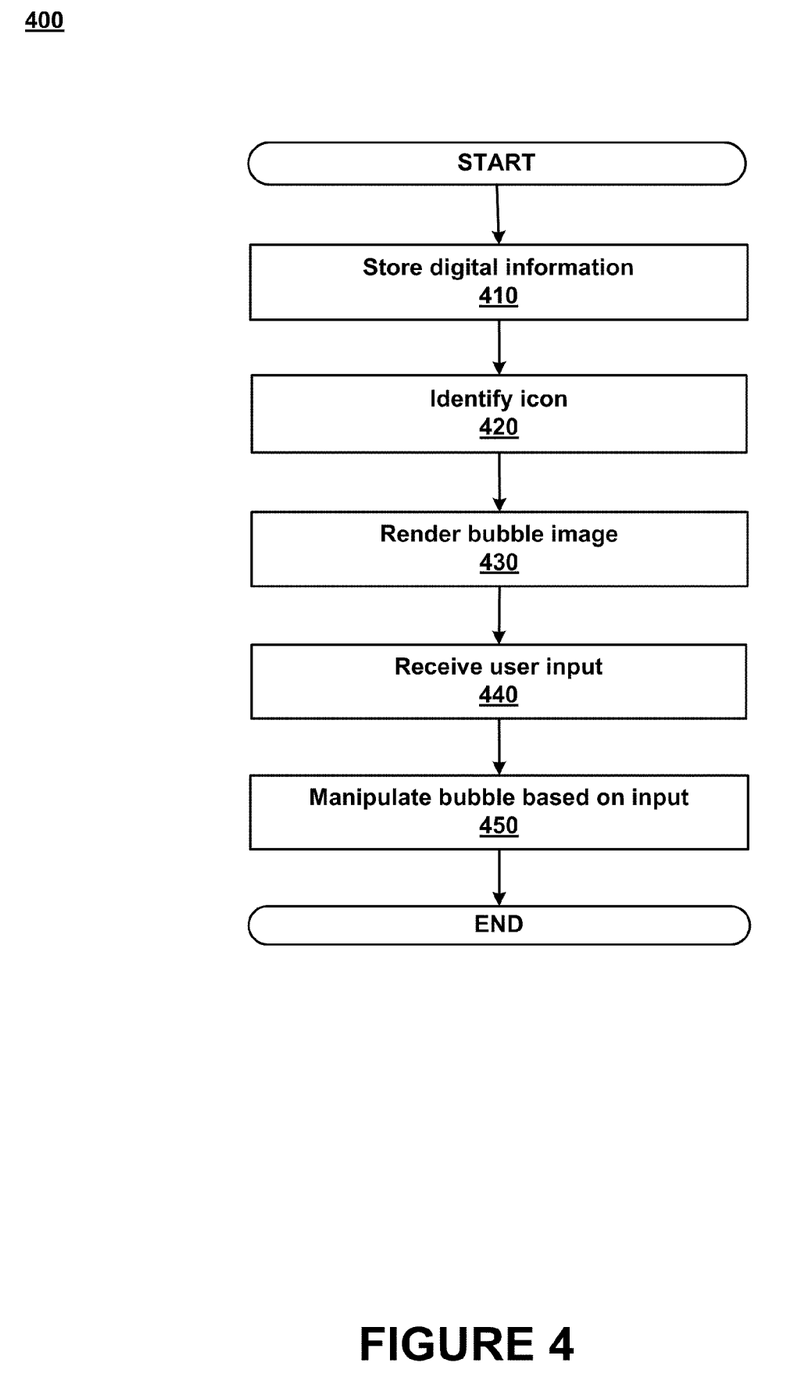
FIG. 4 illustrates a method for managing digital information.

FIG. 4 illustrates a method for managing digital information. In the method, digital information may be stored in memory, an icon associated with the digital information may be identified, a bubble image may be rendered so that the bubble appears to enclose the icon, user input may be received regarding manipulation of the bubble image, and the bubble may be manipulated according to the user input.

In step 410, digital information is stored in memory. Such digital information may encompass any manner of documents, images, audio files, video files, rich media files, and any combination of the foregoing. Such digital information may be associated with an icon. The icon may be assigned to the digital information by a user, or the icon may be assigned by default (e.g., based on a type of the digital information).

In step 420, an icon is identified. When rendering a digital environment for a user, certain digital information stored in memory may be represented by the icon associated with such digital information. As such, an icon associated with the digital information is identified.

In step 430, a bubble image is rendered. Rather than just rendering the icon alone, the icon is rendered inside of a translucent bubble. The bubble image may be rendered as floating in the digital environment, which may be rendered to appear three-dimensional. As such, travelling further away or closer to the point of view of the user may cause the bubble to appear to increase or decrease in size based on the perspective associated with the distance from the user. The size of the bubble image may be adjusted along a scale corresponding to the location of the bubble image within the digital environment. The display of the bubble and other information in the interface occurs in accordance with the execution of software and hardware related to graphics processing and, specifically, the display of that interface environment. The software and hardware may be communicatively coupled to other system components, including those allows for the processing of user input and as occurs in step 440.

In step 440, user input is received. The user input may be related to manipulation of the bubble image or manipulation of the digital information associated with the bubble image. For example, the user input may concern the appearance of the bubble image (e.g., icon image, bubble), movement patterns (e.g., anchoring) of the bubble image, preview settings of the bubble image, etc. The user may input instructions or preferences using any type of interface, including a keyboard, keypad, mouse, touch screen, virtual interface, remote controller, game controller, voice recognition, motion detection/recognition, and so forth. The various hardware and software components necessary for the processing of this information, in addition to the input mechanisms themselves (e.g., a controller, touch screen, or gesture recognition cameras), are known to one of skill in the art.

In step 450, the bubble image is manipulated according to the user input received in step 440. As such, the bubble images in the digital environment may correspond to the preferences and instructions of the user. Likewise, the digital information represented by the bubble images may be organized, viewed, previewed, executed, etc., according to personal settings associated with the user. In some embodiments, certain default settings may be provided, which may be further customized to the user.

Figure 5A:
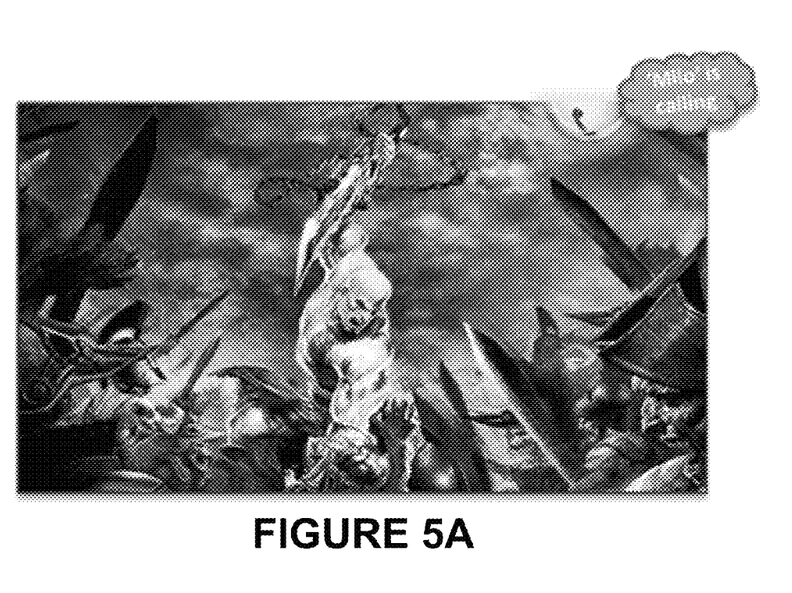
FIG. 5A illustrates the visual management of digital communications.

FIG. 5A illustrates the management of digital communications using the presently described 'bubbles' interface. The digital environment illustrated in the screenshot of FIG. 5A may be content (e.g., video or a video game) being interacted with by a user. While the content is being played, a communication (e.g., telephone call, instant message, email, short message service (SMS) text message) may be sent to the user by a third-party. A notification regarding such a communication may be displayed as a small bubble or cloud that appears in the digital environment. Depending on user preferences, the content may continue playing, or it may pause once the notification is received. The user may or may not choose to view or accept the communication. For example, the user may choose to close the notification bubble/cloud. In some instances, the notification bubble/cloud may fade away if the user does not indicate any wish to view the communication. The notification bubble/cloud may appear again once the content has finished playing or the window displaying the content has closed.

Figure 5B:
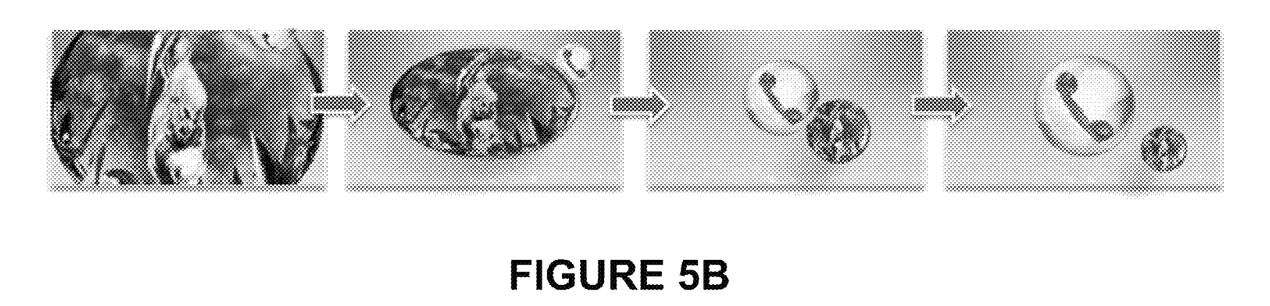
FIG. 5B further illustrates the visual management of digital communications.

FIG. 5B further illustrates the management of digital communications using the presently described 'bubbles interface.' If the user chooses to view or accept the communication referenced in FIG. 5A through some user input such as touching the bubble, the window displaying the content being played may be minimized and represented by another bubble. As the window associated with the content is being minimized, the notification bubble/cloud may expand to allow the user to more easily manipulate the same or to display more options associated with the notification or communication. Once the user is finished viewing and/or responding to the communication, the user may choose to return to the content being played by selecting the associated bubble that was previously minimized. The bubble may then be maximized or expanded to fill the digital environment.

Figure 6:
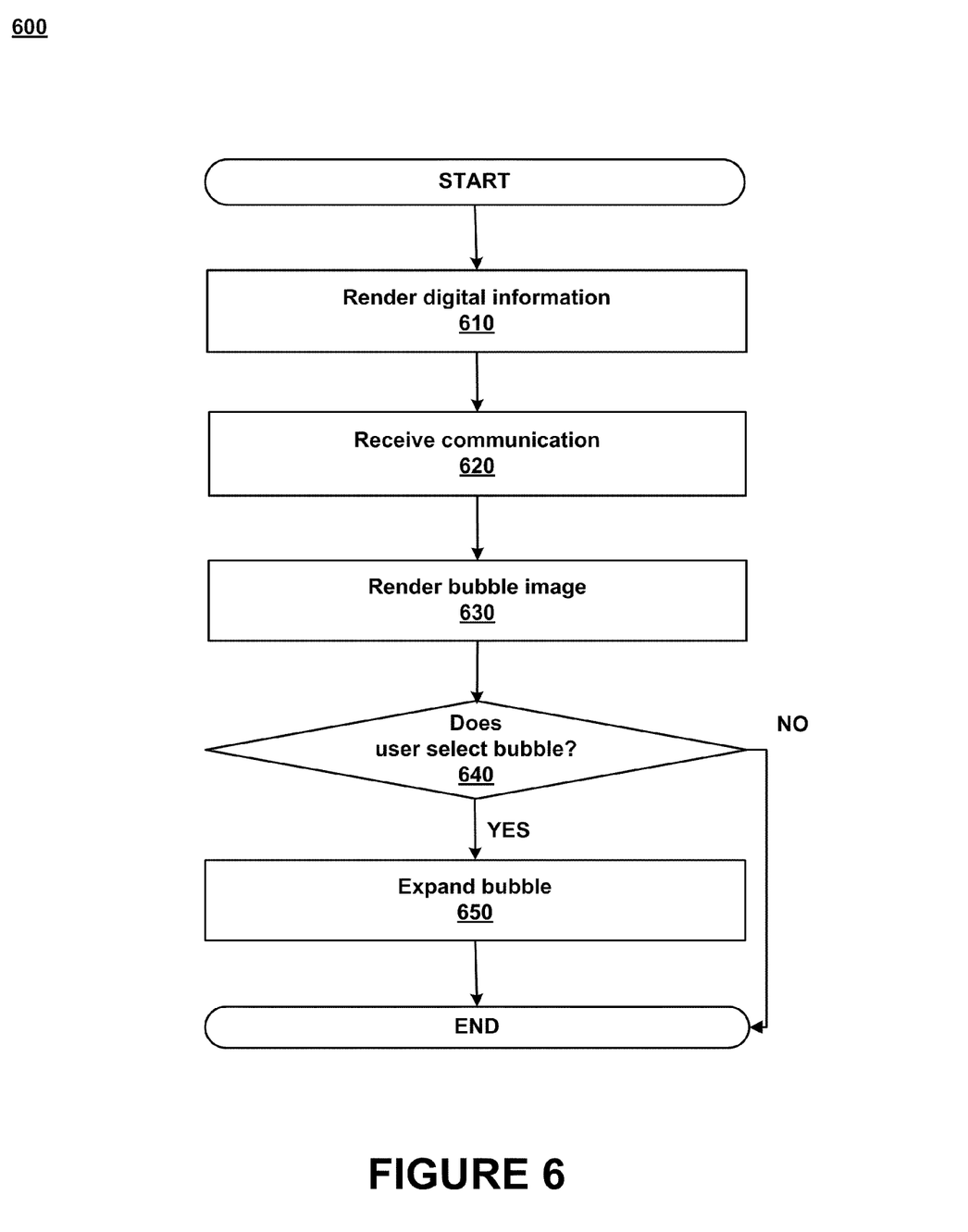
FIG. 6 illustrating a method for managing digital communications.

FIG. 6 illustrates a method for managing digital communications. In the method of FIG. 6, digital information may be rendered, a communication may be received, a bubble image may be rendered, and it may be determined whether the user selects the bubble. If the user selects the bubble, the bubble may be expanded.

In step 610, digital information is rendered by the user device. The user device may be any type of computing device, including desktop computer, laptop computer, Netbook, mobile device, smart phone, or game console. The digital information rendered in the digital environment may be associated with content being viewed or played by the user. As such, most, if not all, of the space in the digital environment may be taken up by the content being viewed or played by the user.

In step 620, a communication is received by the user device. The communication may be any type of communication, including telephone call, instant message, SMS text message, a voicemail message, or email.

In step 630, a bubble image is rendered. The bubble image, which may also resemble a cloud, may include a notification message regarding the communication inside a bubble (or cloud). As illustrated in FIG. 5A, the bubble may also be associated with another bubble indicating the type of communication. FIG. 5A specifically illustrates a bubble image including a telephone image associated with the notification that "'Milo' is calling."

In step 640, it is determined whether the user selects the bubble. The user may select the bubble, thereby indicating the intent to accept or view the communication. For example, if the communication were a telephone call, the user may select the bubble, which allows the digital environment to switch over to rendering images that may be more relevant to the present task (e.g., viewing, accepting, or responding to the communication).

If the user does select the bubble, the method may proceed to step 650. In step 650, the window displaying the content is minimized to a small bubble, and the bubble image associated with the communication notification may be expanded. The expanded bubble image may or may not expand to take up most of the space in the digital environment as illustrated in the series of screenshots of FIG. 5B. The expanded bubble image may further display additional options associated with the communication (not illustrated in FIG. 5B). For example, if the communication were a telephone call, options may include muting, conference call mode, speaker mode, etc.

If the user does not select the bubble or specifically indicates a wish to refrain from viewing/accepting the communication, the bubble image may fade away from the digital environment, is minimized and/or is assigned to the background. The user may continue playing the content or viewing the content displayed in the digital environment. Once play of the content stops or the window associated with the content is closed, however, the bubble image notification may reappear.

The present invention may be implemented in an application that may be operable using a variety of end user devices. The present methodologies described herein are fully intended to be operable on a variety of devices. The present invention may also be implemented with cross-title neutrality wherein an embodiment of the present system may be utilized across a variety of titles from various publishers.

Computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of computer-readable media include, for example, a floppy disk, a flexible disk, a hard disk, magnetic tape, other magnetic storage media, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for managing digital information, the method comprising:

storing digital information in memory, the stored digital information including one or more digital files; and executing instructions stored in memory, wherein execution of the instructions by a processor:

identifies an icon associated with the stored digital information, renders a digital environment as a three-dimensional space, and renders a bubble image comprising the icon inside a translucent bubble, the rendered bubble image appearing to float in the digital environment, wherein the bubble image is manipulable in the digital environment by a user, wherein the floating of the manipulable bubble image includes freely travelling movement of the bubble image from one location to a plurality of other locations in the three-dimensional space of the digital environment when not being manipulated by the user, wherein the freely travelling movement of the bubble image occurs according to one or more user-defined preferences, wherein rendering the floating of the bubble image in the three-dimensional space of the digital environment includes adjusting the size of the bubble image along a scale corresponding to location in the three-dimensional space, wherein the bubble image is anchored to a location or path in the digital environment in response to user manipulation input selecting the bubble image and specifying the location or path, wherein a field of motion of the bubble image is limited to the location or path, wherein selection of the bubble image by the user results in replacing the icon inside the translucent bubble of the bubble image with a first form of preview display of the stored digital information associated with the icon such that a portion of the stored digital information is displayed as a partial list that is scrollable in the first form of preview display within the bubble, and wherein the translucent bubble is scrollable in an up/down direction and in a sideways direction, wherein each direction of scrolling is associated with scrolling a different form of preview display such that portions of the stored digital information associated with the icon are scrollable within the translucent bubble in different forms, and wherein changing the direction of scrolling changes the first form of preview display of the stored digital information associated with the icon to a second form of preview display such that a portion of the stored digital information associated with the icon is scrollable within the bubble in the second form.

2. The method of claim 1, further comprising rendering floating of the bubble image, wherein the bubble image appears to travel from one location in the digital environment to a location off-screen from the rendered digital environment in absence of user manipulation input.

3. The method of claim 1, wherein the anchored bubble image further appears to bob or bounce at the specified location.

4. The method of claim 1, further comprising:
receiving user manipulation input, wherein the user manipulation input concerns selection of the bubble image and a request for a preview of the stored digital information, and
rendering at least part of the stored digital information in response to the preview request.

5. The method of claim 4, further comprising flattening the bubble in response to the preview request.

6. The method of claim 1, further comprising:
receiving user manipulation input, wherein the user manipulation input concerns selection of the bubble image and a request for a view of the stored digital information, and
rendering at least part of each digital file encompassed by the stored digital information in response to the view request.

7. The method of claim 6, further comprising bursting the bubble in response to the view request.

8. The method of claim 6, wherein rendering at least part of each digital file comprises identifying an icon associated with each digital file and rendering a bubble image budding from the bubble image associated with the stored digital information, the budding bubble image comprising the icon associated with the digital file inside a translucent bubble.

9. The method of claim 6, wherein the stored digital information comprises a plurality of digital files and wherein a bubble image associated with a digital file is tethered to another bubble image associated with another digital file.

10. The method of claim 6, wherein rendering at least part of the digital file includes:
expanding the bubble to conform to a screen in which the digital environment is rendered; and
rendering a digital display associated with the digital file, the digital display appearing inside the bubble conformed to the screen.

11. The method of claim 10, further comprising shrinking the bubble from the expanded screen conformation to an unexpanded conformation in response to a signal.

12. The method of claim 11, wherein the signal includes user manipulation input concerning selection of another bubble image.

13. The method of claim 1, further comprising receiving a notification and rendering a bubble image associated with the notification.

14. The method of claim 1, wherein a plurality of bubble images appear in the digital environment and further comprising:
receiving user manipulation input, wherein the user manipulation input concerns a grouping request, the grouping request designating at least two of the plurality of bubble images as part of a same group; and
merging the designated bubble images into one bubble image, wherein the stored digital information previously represented by the designated bubble images is collectively represented by the merged bubble image.

15. The method of claim 1, wherein a plurality of bubble images appear in the digital environment and further comprising:
receiving user manipulation input, wherein the user manipulation input concerns a grouping request, the grouping request designating at least two of the plurality of bubble images as part of a same group; and
rendering a tether between the two bubble images based on the grouping request.

16. The method of claim 1, wherein a user manipulates the bubble image via input on a touch screen.

17. The method of claim 1, wherein a user manipulates the bubble image via input using voice recognition.

18. A non-transitory computer-readable storage medium, having embodied thereon a program, the program executable by a processor to perform a method for managing digital information, the method comprising:
storing digital information in memory, the stored digital information including one or more digital files,
identifying an icon associated with the stored digital information, and
rendering a bubble image comprising the icon inside a translucent bubble, the bubble image appearing to float in a digital environment,
wherein the bubble image is manipulable in the digital environment by a user,
wherein the floating of the manipulable bubble image includes freely travelling movement of the bubble image from one location to a plurality of other locations in the three-dimensional space of the digital environment when not being manipulated by the user,
wherein the freely travelling movement of the bubble image occurs according to one or more user-defined preferences,
wherein rendering the floating of the bubble image in the three-dimensional space of the digital environment includes adjusting the size of the bubble image along a scale corresponding to location in the three-dimensional space,
wherein the bubble image is anchored to a location or path in the digital environment in response to user manipulation input selecting the bubble image and specifying the location or path, wherein a field of motion of the bubble image is limited to the location or path,
wherein selection of the bubble image by the user results in replacing the icon inside the translucent bubble of the bubble image with a first form of preview display of the stored digital information associated with the icon such that a portion of the stored digital information is displayed as a partial list that is scrollable in the first form of preview display within the bubble, and
wherein the translucent bubble is scrollable in an up/down direction and in a sideways direction, wherein each direction of scrolling is associated with scrolling a different form of preview display such that portions of the stored digital information associated with the icon are scrollable within the translucent bubble in different forms, and wherein changing the direction of scrolling changes the first form of preview display of the stored digital information associated with the icon to a second form of preview display such that a portion of the stored digital information associated with the icon is scrollable within the bubble in the second form.

19. The method of claim 1, wherein the form of preview display is one of a list, series of thumbnail images, and detailed information regarding a list item.

* * * * *